(12) United States Patent
Suzuki et al.

(10) Patent No.: US 11,370,412 B2
(45) Date of Patent: Jun. 28, 2022

(54) POWER UNIT FOR VEHICLE AND VEHICLE CONTROL APPARATUS

(71) Applicant: SUBARU CORPORATION, Tokyo (JP)

(72) Inventors: Hiroshi Suzuki, Tokyo (JP); Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 261 days.

(21) Appl. No.: 15/995,028

(22) Filed: May 31, 2018

(65) Prior Publication Data

US 2019/0031179 A1    Jan. 31, 2019

(30) Foreign Application Priority Data

Jul. 28, 2017 (JP) .............................. JP2017-146373

(51) Int. Cl.
 *B60W 20/17* (2016.01)
 *B60K 6/485* (2007.10)
 *B60K 6/26* (2007.10)
(52) U.S. Cl.
 CPC .............. *B60W 20/17* (2016.01); *B60K 6/26* (2013.01); *B60K 6/485* (2013.01);
 (Continued)
(58) Field of Classification Search
 CPC .... B60K 6/26; B60K 6/485; B60K 2006/268; B60K 6/48; B60W 20/17;
 (Continued)

(56) References Cited

U.S. PATENT DOCUMENTS

| 11,167,746 B2 * | 11/2021 | Komuro ................ B60W 20/13 |
| 2004/0088103 A1 * | 5/2004 | Itow ....................... B60K 6/485 |
| | | 701/110 |

(Continued)

FOREIGN PATENT DOCUMENTS

| JP | 2008-239126 A | 10/2008 |
| JP | 2008239126 A | * 10/2008 |

(Continued)

OTHER PUBLICATIONS

Japanese Office Action issued in corresponding Japanese Patent Application No. 2017-146373, dated Feb. 19, 2019, with English Translation.

*Primary Examiner* — Fadey S. Jabr
*Assistant Examiner* — Mohamed Abdo Algehaim
(74) *Attorney, Agent, or Firm* — McDermott Will & Emery LLP

(57) ABSTRACT

A vehicle control apparatus to be mounted on a vehicle including an engine includes an electric motor, an electricity storage device, and a motor controller. The electric motor is coupled to the engine and generates motor power. The electricity storage device is coupled to the electric motor through a power supply cable. The motor controller causes execution of an assistance mode. The assistance mode includes controlling the electric motor to a powering state to transmit the motor power to the engine in operation. The motor controller permits the execution of the assistance mode on the condition that a rotation speed of the electric motor is lower than a threshold. The motor controller prohibits the execution of the assistance mode on the condition that the rotation speed of the electric motor is higher than the threshold.

20 Claims, 11 Drawing Sheets

(52) U.S. Cl.
CPC .. *B60K 2006/268* (2013.01); *B60W 2510/081* (2013.01); *B60W 2710/081* (2013.01); *B60Y 2200/92* (2013.01); *B60Y 2300/60* (2013.01); *Y10S 903/906* (2013.01)

(58) Field of Classification Search
CPC ..... B60W 2710/081; B60W 2510/081; B60W 10/08; B60W 20/19; B60W 20/15; B60W 10/04; B60W 10/06; B60W 20/00–20/50; B60Y 2200/92; B60Y 2300/60; B60Y 2400/47; F02N 11/04; F02N 2200/063; F02N 2200/062; F02N 2200/061; F02N 11/0866; F02N 11/00–11/14; F02N 22/00022; F02N 2200/042; Y10S 903/906; Y02T 90/14; Y02T 10/70; Y02T 10/7072; Y02T 10/62; F02D 1/00–2700/10
USPC .......................................................... 701/22
See application file for complete search history.

(56) References Cited

U.S. PATENT DOCUMENTS

| | | | | |
|---|---|---|---|---|
| 2009/0171523 | A1* | 7/2009 | Luo | B60W 10/02 701/22 |
| 2009/0200991 | A1* | 8/2009 | Yoshida | B60L 58/20 320/166 |
| 2010/0156333 | A1* | 6/2010 | Chen | B60L 50/16 318/400.33 |
| 2010/0244459 | A1* | 9/2010 | Gibson | F02N 11/0866 290/38 R |
| 2011/0015813 | A1* | 1/2011 | Munukur | B60W 20/15 701/22 |
| 2011/0137503 | A1* | 6/2011 | Koide | B60K 6/46 701/22 |
| 2012/0078456 | A1* | 3/2012 | Hakumura | B60W 30/188 701/22 |
| 2012/0203417 | A1* | 8/2012 | Matsui | B60W 20/40 701/22 |
| 2012/0295757 | A1* | 11/2012 | Watanabe | B60W 10/06 477/4 |
| 2014/0203760 | A1* | 7/2014 | Lammers | F02C 6/14 320/107 |
| 2015/0069935 | A1* | 3/2015 | Yamane | B60L 50/10 318/139 |
| 2015/0321659 | A1* | 11/2015 | Sato | B60W 20/17 903/905 |
| 2015/0354170 | A1* | 12/2015 | Ishihara | B60W 10/08 701/22 |
| 2016/0102644 | A1* | 4/2016 | Ouchi | F02N 11/0859 290/31 |
| 2017/0008509 | A1* | 1/2017 | Sato | B60W 10/06 |
| 2017/0050635 | A1* | 2/2017 | Kitahata | B60K 6/26 |
| 2017/0130688 | A1* | 5/2017 | Fujita | F02N 11/006 |
| 2017/0232867 | A1* | 8/2017 | Fukazu | B60K 1/04 318/503 |
| 2017/0240169 | A1* | 8/2017 | Coulter | G05B 13/048 |
| 2017/0259825 | A1* | 9/2017 | Okada | B60W 10/08 |
| 2017/0328331 | A1* | 11/2017 | Fujita | F02D 41/062 |
| 2018/0147931 | A1* | 5/2018 | Toyota | B60K 6/36 |
| 2018/0209355 | A1* | 7/2018 | Nakane | F02D 17/04 |
| 2018/0339786 | A1* | 11/2018 | Thomassin | B64D 35/08 |
| 2018/0354370 | A1* | 12/2018 | Horii | B60W 20/13 |
| 2019/0001963 | A1* | 1/2019 | Kim | B60K 6/387 |
| 2019/0010885 | A1* | 1/2019 | Dudar | B60W 10/06 |
| 2019/0126737 | A1* | 5/2019 | Lo | B60L 50/15 |
| 2019/0152470 | A1* | 5/2019 | Liu | B60W 10/02 |
| 2019/0249615 | A1* | 8/2019 | Matsumura | B60W 20/40 |
| 2019/0359201 | A1* | 11/2019 | Komuro | B60W 20/17 |
| 2019/0389452 | A1* | 12/2019 | Duan | B60W 10/26 |

FOREIGN PATENT DOCUMENTS

| | | |
|---|---|---|
| JP | 2013-141836 A | 7/2013 |
| JP | 2013-256267 A | 12/2013 |
| JP | 2014-019379 A | 2/2014 |
| JP | 2014-139038 A | 7/2014 |

\* cited by examiner

POWER UNIT FOR VEHICLE AND VEHICLE CONTROL APPARATUS

CROSS-REFERENCE TO RELATED APPLICATIONS

The present application claims priority from Japanese Patent Application No. 2017-146373 filed on Jul. 28, 2017, the entire contents of which are hereby incorporated by reference.

BACKGROUND

The technology relates to a vehicle control apparatus to be mounted on a vehicle.

As a vehicle control apparatus to be mounted on a vehicle, there has been proposed a control apparatus including an electric motor coupled to an engine, e.g., a starter generator. For example, reference is made to Japanese Unexamined Patent Application Publication (JP-A) No. 2013-256267. In the control apparatus as described in JP-A No. 2013-256267, stepping down of an accelerator pedal by a driver causes execution of an assistance control. The assistance control includes powering the starter generator to assist an engine.

SUMMARY

An aspect of the technology provides a vehicle control apparatus to be mounted on a vehicle including an engine. The vehicle control apparatus includes an electric motor, an electricity storage device, and a motor controller. The electric motor is configured to be coupled to the engine and generates motor power. The electricity storage device is configured to be coupled to the electric motor through a power supply cable. The motor controller is configured to cause execution of an assistance mode. The assistance mode includes controlling the electric motor to a powering state to transmit the motor power to the engine in operation. The motor controller is configured to permit the execution of the assistance mode on the condition that a rotation speed of the electric motor is lower than a threshold. The motor controller is configured to prohibit the execution of the assistance mode on the condition that the rotation speed of the electric motor is higher than the threshold.

An aspect of the technology provides a vehicle control apparatus to be mounted on a vehicle including an engine. The vehicle control apparatus includes an electric motor, an electricity storage device, and circuitry. The electric motor is configured to be coupled to the engine and generates motor power. The electricity storage device is configured to be coupled to the electric motor through a power supply cable. The circuitry is configured to cause execution of an assistance mode. The assistance mode includes controlling the electric motor to a powering state to transmit the motor power to the engine in operation. The circuitry is configured to permit the execution of the assistance mode on the condition that a rotation speed of the electric motor is lower than a threshold. The circuitry is configured to prohibit the execution of the assistance mode on the condition that the rotation speed of the electric motor is higher than the threshold.

DETAILED DESCRIPTION

Figure 1:
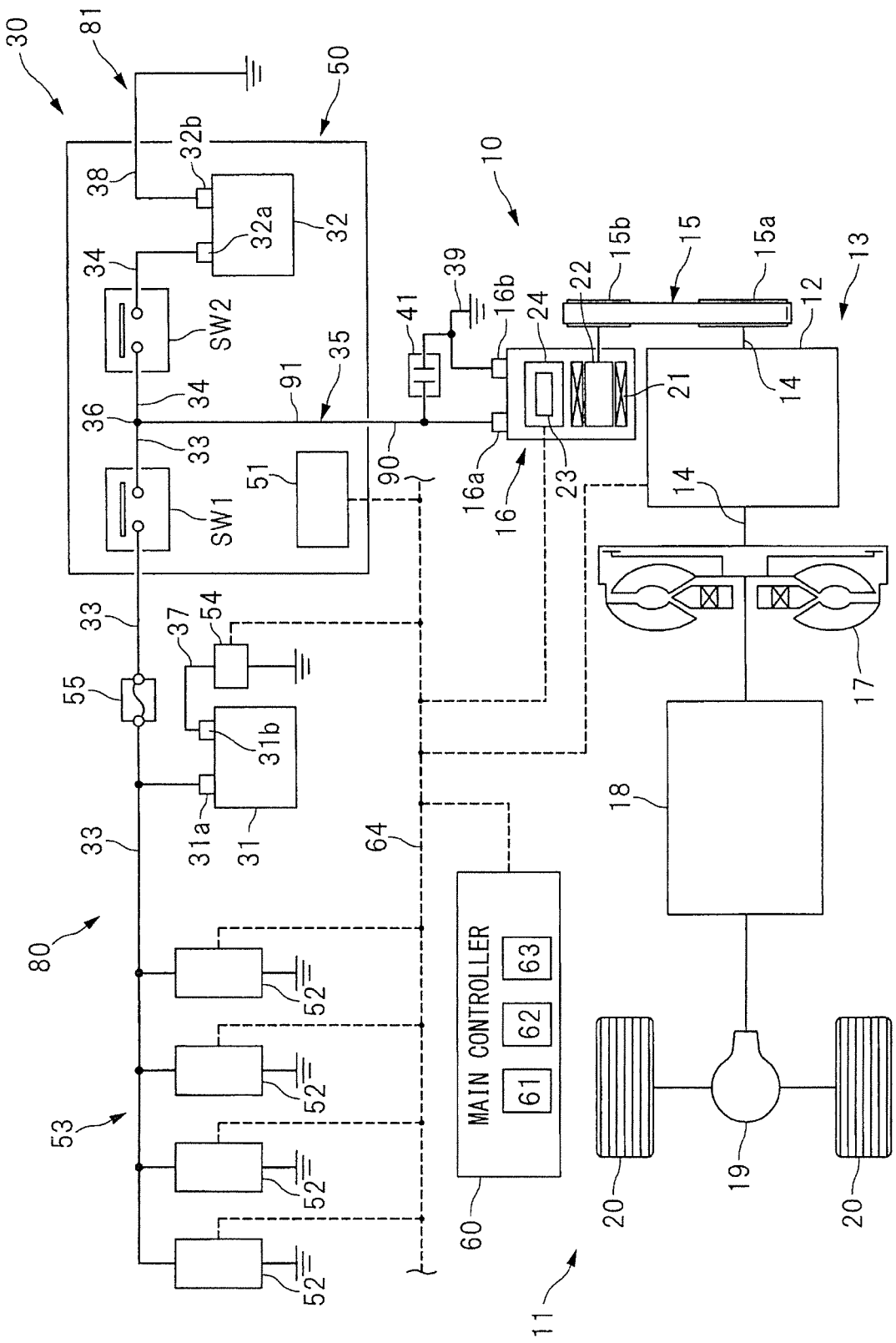
FIG. 1 schematically illustrates a configuration example of a vehicle provided with a vehicle control apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

In powering an electric motor such as a starter generator, current variations occur in a power supply cable that supplies a current to the electric motor. The current variations may cause possibility of vibration of the power supply cable. The vibration of the power supply cable is accompanied by generation of a noise that may constitute a possible cause of lowered vehicle quality. What is therefore desired is to suppress the noise from the power supply cable.

It is desirable to provide a vehicle control apparatus that makes it possible to suppress a noise from a power supply cable.

FIG. 1 is a schematic diagram illustrating a configuration example of a vehicle 11 provided with a vehicle control apparatus 10 according to an example implementation of the technology. Referring to FIG. 1, on the vehicle 11, the vehicle control apparatus 10 according to this implementation is mounted. Moreover, on the vehicle 11, a power unit 13 may be mounted. The power unit 13 may include an engine 12 that serves as a power source. The engine 12 may include a crankshaft 14 to which a starter generator 16 is mechanically coupled via a belt mechanism 15. To the engine 12, a transmission mechanism 18 may also be coupled via a torque converter 17. To the transmission mechanism 18, wheels 20 may be coupled via, for example, a differential mechanism 19. It is to be noted that the belt mechanism 15 may couple the engine 12 and the starter generator 16 together, and include a large-diameter pulley 15a and a small-diameter pulley 15b. The large-diameter pulley 15a may be coupled to the crankshaft 14 of the engine 12. The small-diameter pulley 15b may be coupled to a rotor 22 of the starter generator 16. In one implementation, the starter generator 16 may serve as an "electric motor".

The starter generator 16 is coupled to the engine 12 and generates motor power. The starter generator 16 may be a so-called integrated starter generator (ISG) that serves both as an electric generator and an electric motor. The starter generator 16 may serve not only as the electric generator to be driven by the crankshaft 14 but also as the electric motor that causes rotation of the crankshaft 14. The starter generator 16 may be controlled to a powering state as the electric motor, for example, in restarting the engine 12 in an idling stop control, and in performing an assistance drive of the engine 12 at the time of a start or acceleration.

The starter generator 16 may include a stator 21 having a stator coil and the rotor 22 having a field coil. The starter generator 16 may further include an ISG controller 24 in order to control an electrically conductive state of each of the stator coil and the field coil. The ISG controller 24 may include, for example, an inverter 23, a regulator, and a microcomputer. The ISG controller 24 may control the electrically conductive state of each of the field coil and the stator coil, thus controlling, for example, a power-generation voltage, power-generation torque, and powering torque of the starter generator 16.

[Power Supply Circuit]

Figure 2:
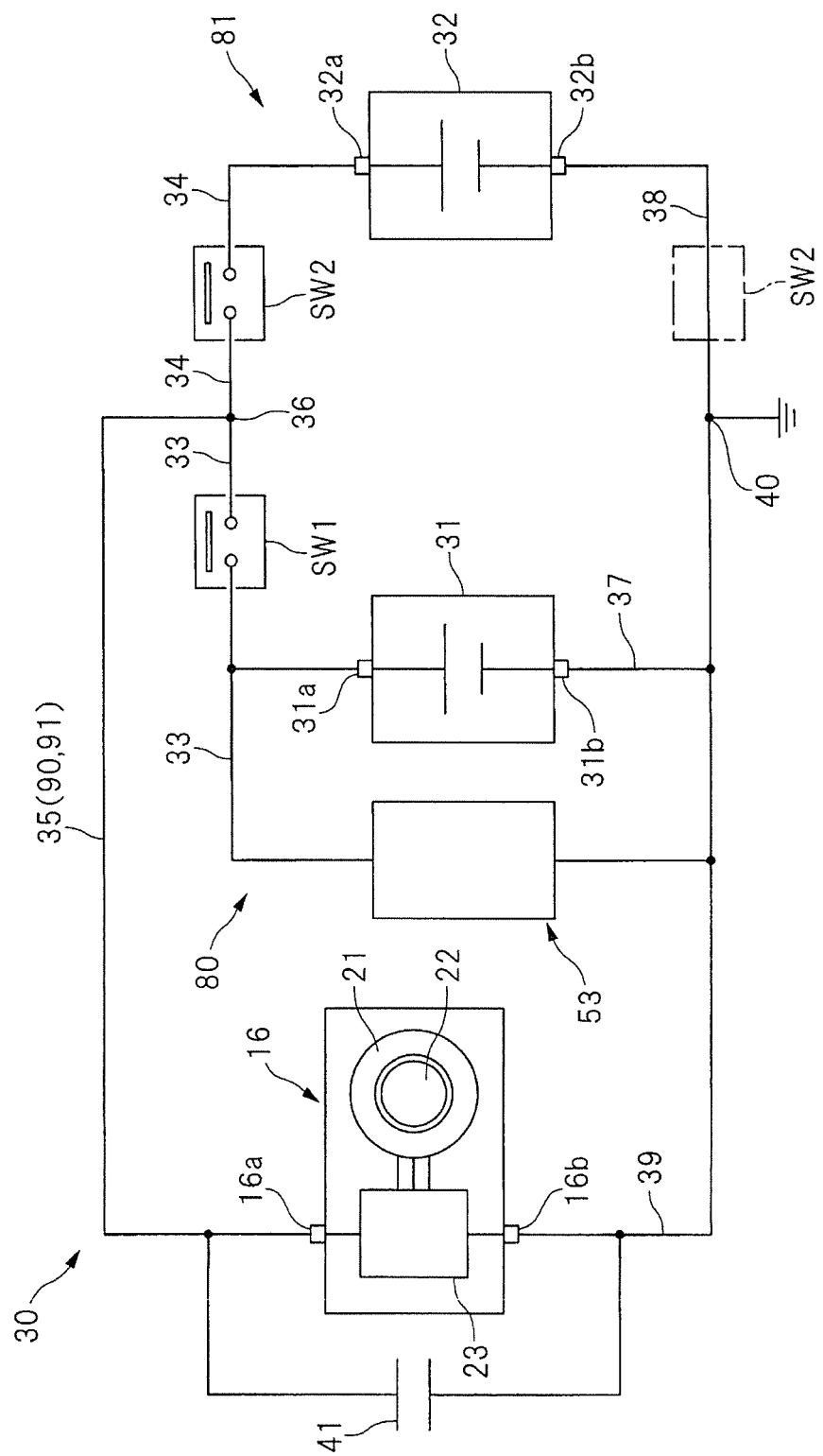
FIG. 2 is a circuit diagram illustrating an example of a power supply circuit.

A description is given of a power supply circuit 30 included in the vehicle control apparatus 10. FIG. 2 is a circuit diagram illustrating an example of the power supply circuit 30. Referring to FIG. 2, the power supply circuit 30 may include a lead battery 31 and a lithium-ion battery 32. The lead battery 31 may be electrically coupled to the starter generator 16. The lithium-ion battery 32 may be electrically coupled to the starter generator 16, in parallel to the lead battery 31. In one implementation, the lithium-ion battery 32 may serve as an "electricity storage device". A terminal voltage of the lithium-ion battery 32 may be higher in design than a terminal voltage of the lead battery 31, in order to actively cause discharge of the lithium-ion battery 32. Further, internal resistance of the lithium-ion battery 32 may be smaller in design than internal resistance of the lead battery 31, in order to actively cause charge and the discharge of the lithium-ion battery 32.

The lead battery 31 may include a positive electrode terminal 31a coupled to a positive electrode line 33. The lithium-ion battery 32 may include a positive electrode terminal 32a coupled to a positive electrode line 34. The starter generator 16 may include a positive electrode terminal 16a coupled to a positive electrode line 35. These positive electrode lines 33 to 35 may be coupled to one another via a node 36. The lead battery 31 may include a negative electrode terminal 31b coupled to a negative electrode line 37. The lithium-ion battery 32 may include a negative electrode terminal 32b coupled to a negative electrode line 38. The starter generator 16 may include a negative electrode terminal 16b coupled to a negative electrode line 39. These negative electrode lines 37 to 39 may be coupled to one another via a reference potential point 40. Moreover, to the positive electrode line 35 and the negative electrode line 39 of the starter generator 16, a bypass condenser 41 may be coupled. In other words, the bypass condenser 41 may be coupled in parallel to the starter generator 16. In one implementation, the bypass condenser 41 may serve as a "condenser".

On the positive electrode line 33 of the lead battery 31, a switch SW1 may be provided. The switch SW1 may be switched between an electrically conductive state and a cutoff state. Controlling the switch SW1 to the electrically conductive state causes the starter generator 16 and the lead battery 31 to be coupled to each other. Controlling the switch SW1 to the cutoff state causes the starter generator 16 and the lead battery 31 to be isolated from each other. Further, on the positive electrode line 34 of the lithium-ion battery 32, a switch SW2 may be provided. The switch SW2 may be switched between an electrically conductive state and a cutoff state. Controlling the switch SW2 to the electrically conductive state causes the starter generator 16 and the lithium-ion battery 32 to be coupled to each other. Controlling the switch SW2 to the cutoff state causes the starter generator 16 and the lithium-ion battery 32 to be isolated from each other.

The switch SW1 and the switch SW2 may each be a switch including a semiconductor element such as, but not limited to, a metal-oxide-semiconductor field-effect transistor (MOSFET). In an alternative implementation, the switch SW1 and the switch SW2 may each be a switch that mechanically opens and closes a contact by means of, for example, electromagnetic force. It is to be noted that the switch SW1 and the switch SW2 are each referred to as, for example, a relay or a contactor as well. In the forgoing description, the switch SW2 is provided on the positive electrode line 34 of the lithium-ion battery 32, but this is non-limiting. For example, as indicated by an alternate long and short dashed line in FIG. 2, the switch SW2 may be provided on the negative electrode line 38 of the lithium-ion battery 32.

As illustrated in FIG. 1, the power supply circuit 30 may include a battery module 50. In the battery module 50, incorporated may be the lithium-ion battery 32, and the switches SW1 and SW2. The battery module 50 may further include a battery controller 51. The battery controller 51 may include, for example, a microcomputer. The battery controller 51 may have a monitoring function and a control function. Non-limiting examples of the monitoring function may include monitoring of a state of charge SOC, a charge current, a discharge current, the terminal voltage, a cell temperature, and the internal resistance of the lithium-ion battery 32. Non-limiting examples of the control function may include controlling the switches SW1 and SW2. It is to be noted that the state of charge SOC refers to a ratio of an electricity storage amount of the battery to a designed capacity of the battery.

Moreover, to the positive electrode line 33 of the lead battery 31, an electric load group 53 may be coupled. The electric load group 53 may include a plurality of electric loads 52. Non-limiting examples of the electric loads 52 that constitute the electric load group 53 may include windshield wipers, headlights, an instrument panel, and a navigation system. Moreover, although undepicted, to the positive electrode line 33 of the lead battery 31, various controllers may be coupled as the electric loads 52. Non-limiting examples of the various controllers may include the ISG controller 24, the battery controller 51, and a main controller 60 described later. Further, on the negative electrode line 37 of the lead battery 31, a battery sensor 54 may be provided. The battery sensor 54 may have a detection function. Non-limiting examples of the detection function may include detection of a charge current, a discharge current, the terminal voltage, and a state of charge SOC of the lead battery 31. It is to be noted that on the positive electrode line 33, a fuse 55 may be provided. The fuse 55 may protect, for example, the electric load group 53.

[Control System of Vehicle Control Apparatus]

Figure 3:
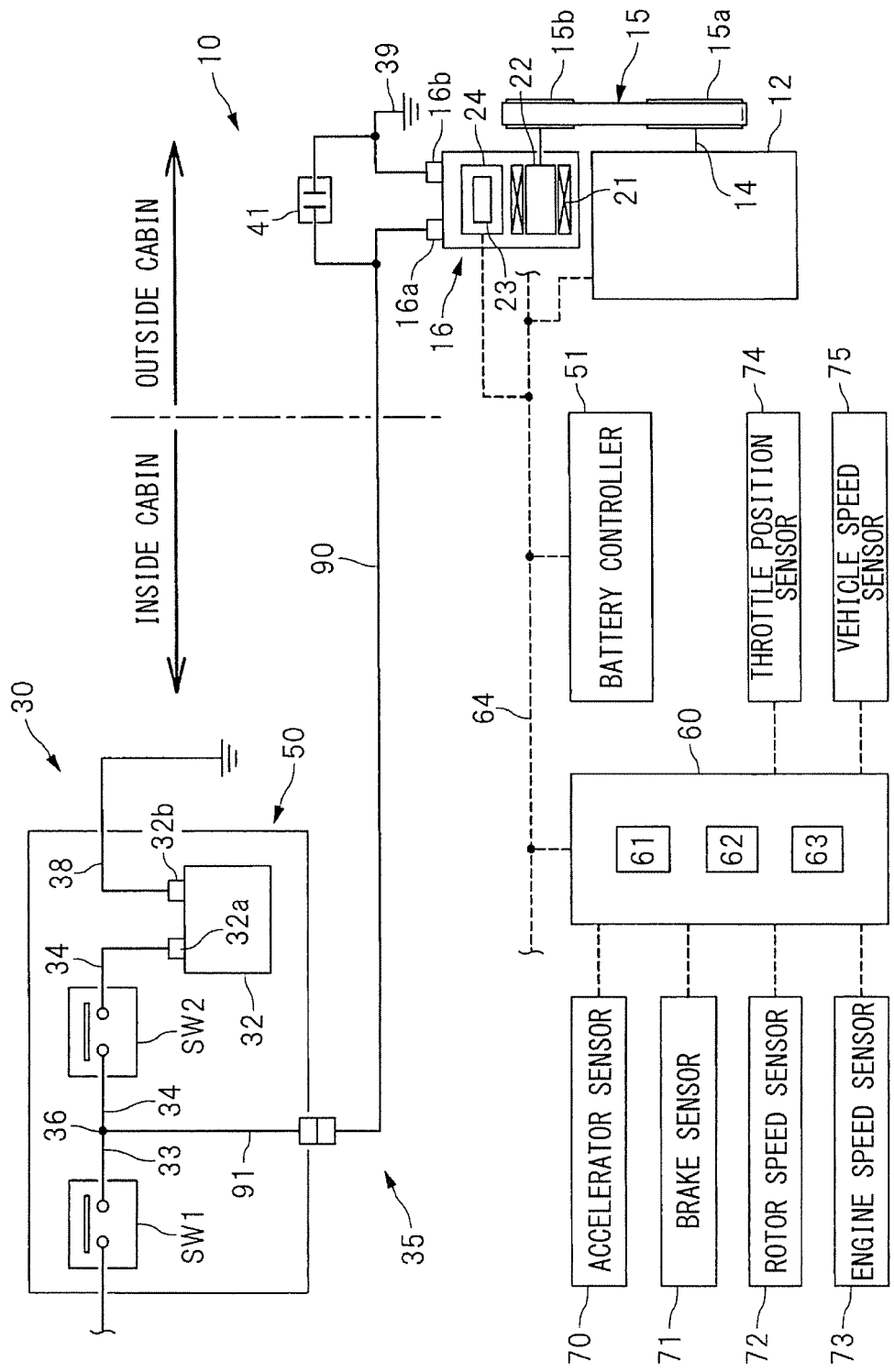
FIG. 3 schematically illustrates a control system of the vehicle control apparatus.

Described is a control system of the vehicle control apparatus 10. FIG. 3 is a schematic diagram of the control system of the vehicle control apparatus 10. Referring to FIGS. 1 and 3, the vehicle control apparatus 10 may include the main controller 60. The main controller 60 may control, for example, the engine 12 and the starter generator 16. The main controller 60 may include, for example, a microcomputer. The main controller 60 may include functional units such as, but not limited to, an engine control unit 61, a motor control unit 62, and a switch control unit 63. The engine control unit 61 may control the engine 12. The motor control unit 62 may control the starter generator 16. The switch control unit 63 may control the switches SW1 and SW2. The main controller 60, and the controllers 24 and 51 as mentioned above may be so coupled to one another as to be able to perform a communication mutually and freely via an on-vehicle network 64. Non-limiting examples of the on-vehicle network 64 may include a controller area network (CAN) and a local interconnect network (UN).

Each of the functional units of the main controller 60 may control, for example, the engine 12, the starter generator 16, and the switches SW1 and SW2, on the basis of information from the various controllers and sensors. The motor control unit 62 of the main controller 60 may output a control signal to the ISG controller 24, and thereby control, for example, the power-generation voltage, the power-generation torque, and the powering torque of the starter generator 16. The switch control unit 63 of the main controller 60 may output a control signal to the battery controller 51, and thereby control the switches SW1 and SW2 to the electrically conductive state or the cutoff state. Non-limiting examples of the sensors to be coupled to the main controller 60 may include an accelerator sensor 70, a brake sensor 71, a rotor speed sensor 72, an engine speed sensor 73, a throttle position sensor 74, and a vehicle speed sensor 75. The accelerator sensor 70 may detect an amount of stepping down of an accelerator pedal. The brake sensor 71 may detect an amount of stepping down of a brake pedal. The rotor speed sensor 72 may detect the number of rotations of the rotor, i.e., a rotation speed of the rotor 22. The engine speed sensor 73 may detect the number of rotations of the engine, i.e., a rotation speed of the crankshaft 14. The throttle position sensor 74 may detect a throttle plate position of a throttle valve. The vehicle speed sensor 75 may detect a vehicle speed.

Further, the motor control unit 62 of the main controller 60 has a function of determining whether or not to execute an assistance mode by the starter generator 16. The assistance mode of the starter generator 16 refers to a traveling mode that includes controlling the starter generator 16 to the powering state during engine operation, and thereby transmitting the motor power to the engine 12 in operation. Executing the assistance mode makes it possible to reduce an amount of fuel consumption of the engine 12, leading to enhancement in fuel consumption performance of the vehicle. For example, the assistance mode by the starter generator 16 may be executed, in a case where the amount of stepping down of the accelerator pedal is larger than a predetermined value, with the state of charge SOC of the lithium-ion battery 32 being higher than a predetermined value.

[Power Supply States]

Figure 4:
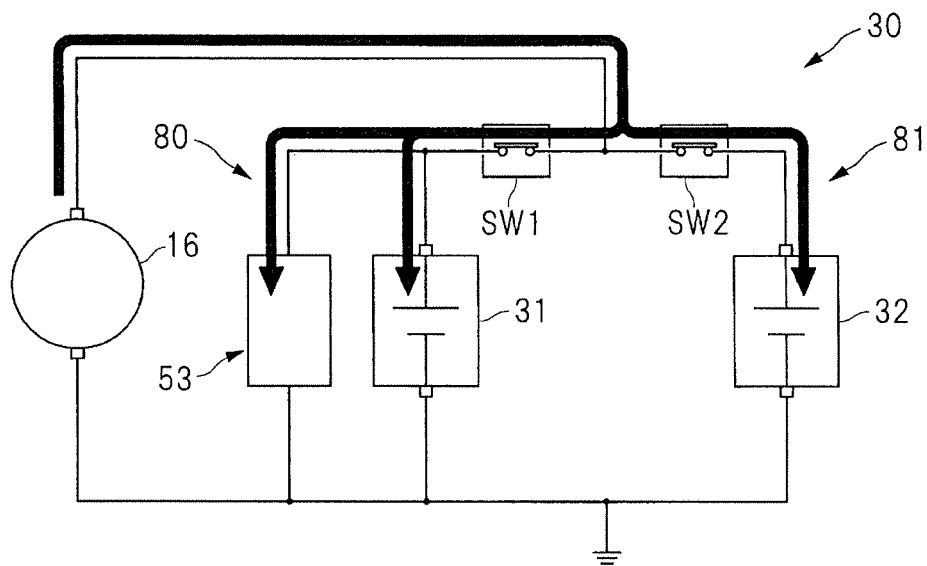
FIG. 4 describes an example of a power supply state, with a starter generator being controlled to a combustion power-generation state.
Figure 5:
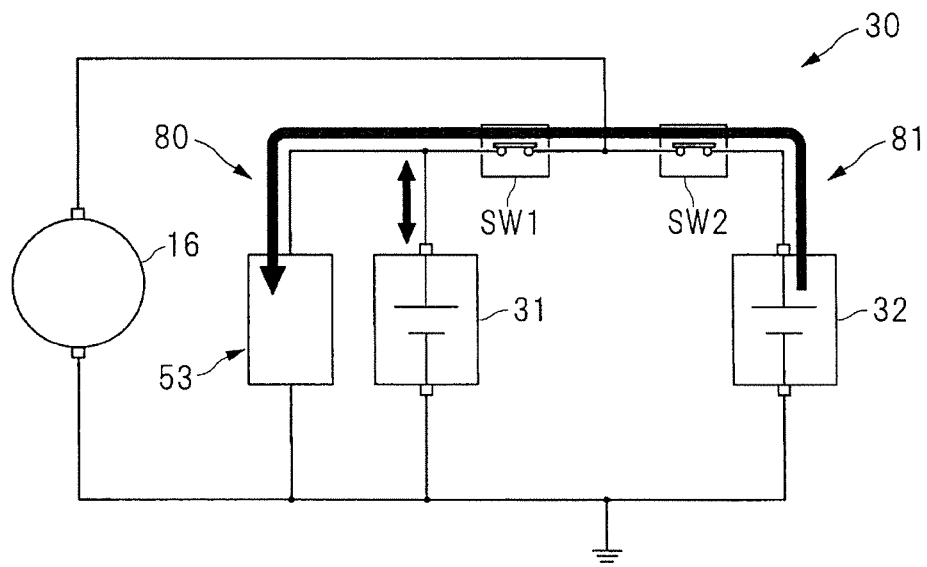
FIG. 5 describes an example of the power supply state, with the starter generator being controlled to a power-generation suspended state.
Figure 6:
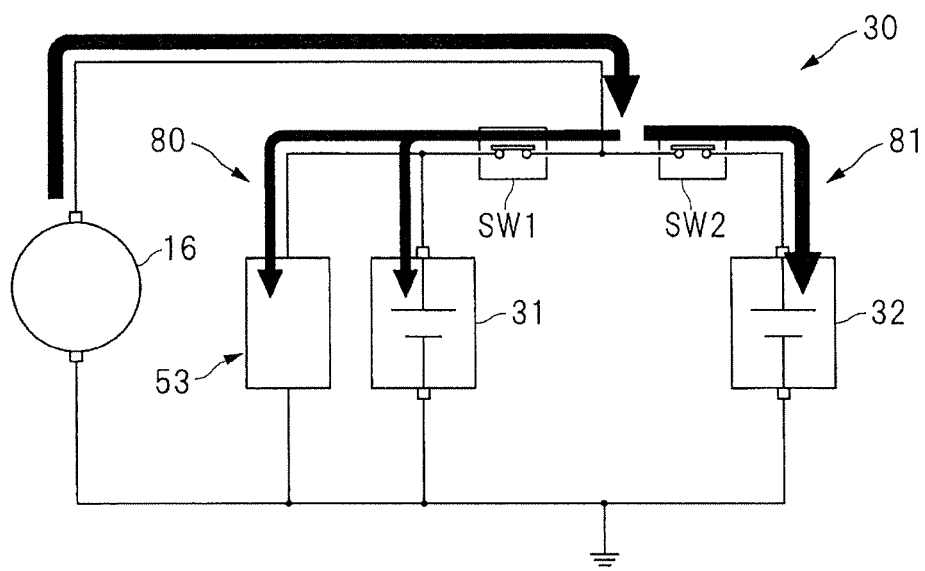
FIG. 6 describes an example of the power supply state, with the starter generator being controlled to a regenerative power-generation state.
Figure 7:
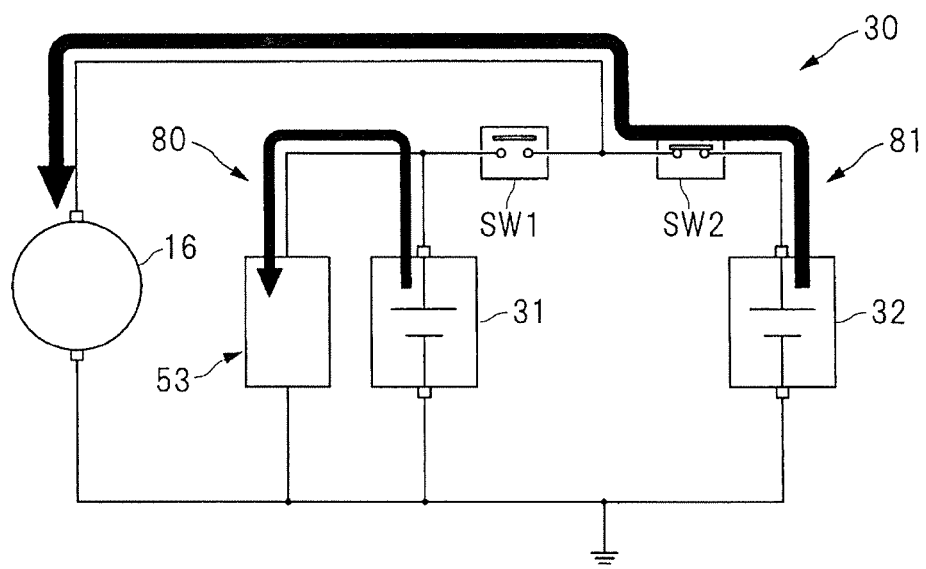
FIG. 7 describes an example of the power supply state, with the starter generator being controlled to a powering state.

A description is given of power supply states in accompaniment with a power-generation control and a powering control of the starter generator 16. FIG. 4 illustrates one example of the power supply state, with the starter generator 16 being controlled to a combustion power-generation state. FIG. 5 illustrates one example of the power supply state, with the starter generator 16 being controlled to a power-generation suspended state. FIG. 6 illustrates one example of the power supply state, with the starter generator 16 being controlled to a regenerative power-generation state. FIG. 7 illustrates one example of the power supply state, with the starter generator 16 being controlled to the powering state.

Referring to FIG. 4, in a case where the electricity storage amount of the lithium-ion battery 32 has lowered, the starter generator 16 may be controlled to the combustion power-generation state. In other words, in a case where the state of charge SOC of the lithium-ion battery 32 is lower than a predetermined lower limit, the starter generator 16 may be controlled to the combustion power-generation state, in order to charge the lithium-ion battery 32 and to increase the state of charge SOC. In controlling the starter generator 16 to the combustion power-generation state, the power-generation voltage of the starter generator 16 may be raised to a greater value than the terminal voltage of the lithium-ion battery 32. This causes power-generated electric power to be supplied from the starter generator 16 to, for example, the lithium-ion battery 32, the electric load group 53, and the lead battery 31, as denoted by black arrows in FIG. 4. It is to be noted that the combustion power-generation state of the starter generator 16 means a state in which the starter generator 16 is driven by the engine 12, to generate electric power.

Referring to FIG. 5, in a case where the electricity storage amount of the lithium-ion battery 32 is sufficient, the starter generator 16 may be controlled to the power-generation suspended state. In other words, in a case where the state of charge SOC of the lithium-ion battery 32 is higher than a predetermined upper limit, the starter generator 16 may be controlled to the power-generation suspended state, because the lithium-ion battery 32 is able to supply electric power to the electric load group 53. In controlling the starter generator 16 to the power-generation suspended state, the power-generation voltage of the starter generator 16 may be lowered to a smaller value than the terminal voltage of the lithium-ion battery 32. This causes electric power to be supplied from the lithium-ion battery 32 to, for example, the electric load group 53, as denoted by a black arrow in FIG. 5. Hence, it is possible to suppress or stop power generation of the starter generator 16, and to reduce an engine load.

As mentioned above, the main controller 60 may control the starter generator 16 to the combustion power-generation state or the power-generation suspended state on the basis of the state of charge SOC. Meanwhile, on decelerated travel, it is necessary to recover much kinetic energy, and to enhance the fuel consumption performance. Therefore, on the decelerated travel, the starter generator 16 may be controlled to the regenerative power-generation state, and the power-generation voltage of the starter generator 16 may be raised within a range in which the power-generation voltage of the starter generator 16 is not higher than withstanding voltages of, for example, the lead battery 31, the lithium-ion battery 32, and the electric load group 53. This makes it possible to supply a large current from the starter generator 16 to the lithium-ion battery 32 and the lead battery 31, as indicated by black arrows in FIG. 6. In other words, it is possible to increase the power-generated electric power of the starter generator 16. It is therefore possible to actively convert the kinetic energy to electric energy, and recover the electric energy, leading to enhancement in energy efficiency of the vehicle 11 and the enhancement in the fuel consumption performance. It is to be noted that because the internal resistance of the lithium-ion battery 32 is smaller than the internal resistance of the lead battery 31, most of the power-generated current is supplied to the lithium-ion battery 32.

As illustrated in FIGS. 4 to 6, in controlling the starter generator 16 to the combustion power-generation state, the regenerative power-generation state, and the power-generation suspended state, the switches SW1 and SW2 may be maintained in the electrically conductive state. In other words, in the vehicle control apparatus 10, it is possible to control the charge and the discharge of the lithium-ion battery 32, without making a switching control of the switches SW1 and SW2, solely by controlling the power-generation voltage of the starter generator 16. It is therefore possible to easily control the charge and the discharge of the lithium-ion battery 32, and to enhance durability of the switches SW1 and SW2.

Moreover, as illustrated in FIG. 7, in controlling the starter generator 16 to the powering state, the switch SW1 may be controlled to the cutoff state. In other words, the switch SW1 may be controlled from the electrically conductive state to the cutoff state, in a case where the starter generator 16 causes starting rotation of the engine 12, and in a case where the assistance mode by the starter generator 16 is executed. This causes a power supply circuit 80 and a power supply circuit 81 to be isolated from each other. The power supply circuit 80 may include the lead battery 31 and the electric load group 53. The power supply circuit 81 may include the lithium-ion battery 32 and the starter generator 16. Accordingly, as indicated by black arrows in FIG. 7, it is possible to supply electric power from the lead battery 31 to the electric load group 53, even in a case with an increase in current consumption of the starter generator 16. Hence, it is possible to prevent an instantaneous voltage drop with respect to the electric load group 53, allowing for appropriate functioning of the electric load group 53.

[Noise Suppression by Bypass Condenser]

As illustrated in FIG. 3, the starter generator 16 may be disposed outside a cabin, e.g., in an engine room. The battery module 50 may be disposed inside the cabin, e.g., in a center console. It follows, therefore, that the lithium-ion battery 32 provided in the battery module 50 may be provided inside the cabin. Moreover, the positive electrode line 35 may be coupled to the positive electrode terminal 16a of the starter generator 16. The positive electrode line 35 may include a power supply cable 90 and a conduction line 91. The power supply cable 90 may be coupled to the positive electrode terminal 16a of the starter generator 16. The conduction line 91 may be provided inside the battery module 50, and be coupled to the power supply cable 90. Thus, the power supply cable 90 may supply a current to the starter generator 16, and be provided across inside the cabin and outside the cabin. In other words, at least part of the power supply cable 90 may be provided inside the cabin.

In controlling the starter generator 16 to the powering state, a large current is supplied from the lithium-ion battery 32 to the starter generator 16. In other words, a large direct current discharged from the lithium-ion battery 32 is supplied to the inverter 23 of the starter generator 16 through the power supply cable 90. Thus, the direct current is converted to an alternating current through the inverter 23. The alternating current converted is supplied to the stator 21 of the starter generator 16. Accordingly, in the power supply cable 90, current variations occur in accompaniment with switching operation of the inverter 23. The current variations cause vibration of the power supply cable 90, resulting in generation of a noise. Because such a noise to be transmitted from the power supply cable 90 to inside the cabin may constitute the possible cause of the lowered vehicle quality, there has been a desire for countermeasures against the noise of the power supply cable 90.

Thus, as illustrated in FIGS. 1 to 3, the bypass condenser 41 may be coupled in parallel to the starter generator 16. This makes it possible to suppress the current variations, owing to charge and discharge of the bypass condenser 41, even if the current variations are likely to occur in the power supply cable 90. In other words, it is possible to suppress the vibration of the power supply cable 90 in accompaniment with the current variations, leading to suppression of the noise to be generated from the power supply cable 90.

Figure 8:
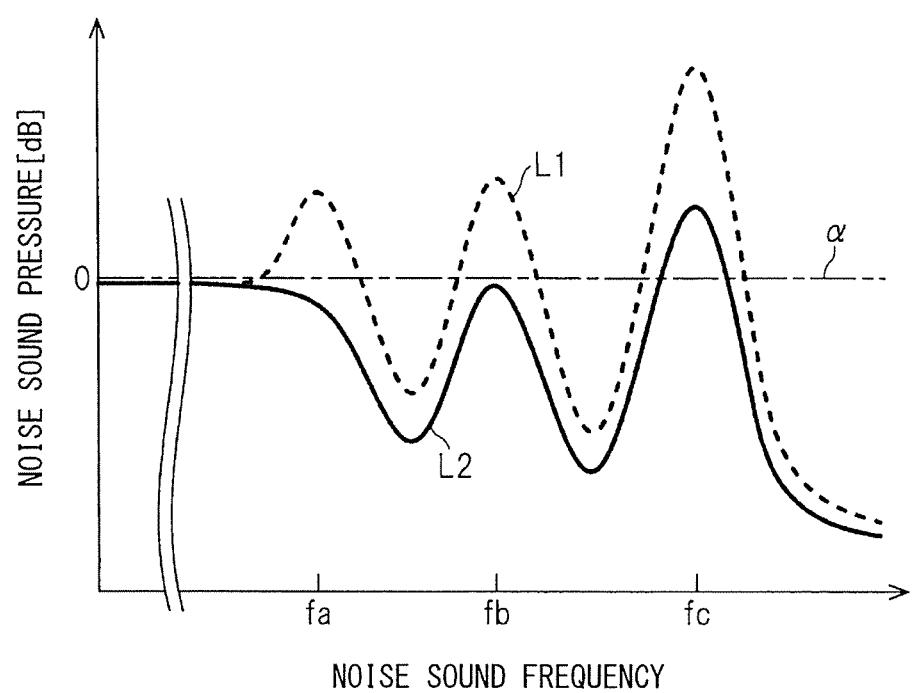
FIG. 8 schematically illustrates a sound pressure level of a noise to be generated from a power supply cable.

FIG. 8 schematically illustrates a sound pressure level of the noise to be generated from the power supply cable 90. The sound pressure level illustrated in FIG. 8 is a sound pressure level of the noise to be transmitted from the power supply cable 90 to inside the cabin, in controlling the starter generator 16 to the powering state. Moreover, FIG. 8 illustrates a sound pressure level to be measured at a driver's seat inside the cabin. A characteristic line L1 denoted by a broken line in FIG. 8 indicates a sound pressure level in a case without the bypass condenser 41. A characteristic line L2 denoted by a solid line in FIG. 8 indicates a sound pressure level in a case with the bypass condenser 41 being provided. Further, an alternate long and short dashed line a illustrated in FIG. 8 indicates a minimum audible value defined by an equal loudness curve. The minimum audible value $\alpha$ is a sound pressure level at each frequency perceptible to an occupant having normal sense of hearing. The minimum audible value as the perceptible sound pressure level is indicated as zero (0) [dB]. In other words, a situation that the sound pressure level is lower than the minimum audible value $\alpha$ is a situation that the noise is not sensed by the occupant inside the cabin. A situation that the sound pressure level is higher than the minimum audible value $\alpha$ is a situation that the noise is sensed by the occupant inside the cabin.

As indicated by the characteristic line L1 in FIG. 8, in the case without the bypass condenser 41, upon a large current flowing through the power supply cable 90 in accompaniment with the powering of the starter generator 16, the noise is generated at each of frequencies fa, fb, and fc. The noise has the sound pressure level higher than the minimum audible value $\alpha$. In contrast, as indicated by the characteristic line L2 in FIG. 8, in the case with the bypass condenser 41 being provided, it is possible to lower the sound pressure level of the noise to a lower value than the minimum audible value $\alpha$ at each of the frequencies fa and fb on low-frequency side, although the sound pressure level of the noise is slightly higher than the minimum audible value $\alpha$ at the frequency fc on high-frequency side. Thus, coupling the bypass condenser 41 in parallel to the starter generator 16 makes it possible to considerably reduce the noise of the power supply cable 90. It is to be noted that the frequencies fa, fb, and fc at which the sound pressure level has peaks are noise frequencies inherent to the starter generator 16 that causes the vibration of the power supply cable 90 because of the switching operation.

[Noise Suppression by Prohibition of Assistance Mode]

As described, coupling the bypass condenser 41 in parallel to the starter generator 16 makes it possible to considerably lower the noise to be transmitted from the power supply cable 90 to inside the cabin. In the example illustrated in FIG. 8, however, even in the case with the bypass condenser 41 being installed, the sound pressure level at the frequency fc is slightly higher than the minimum audible value α. In other words, there is possibility that the noise is sensed by the occupant. This leads to a desire for further countermeasures against the noise. Thus, the vehicle control apparatus 10 according to one implementation of the technology prohibits the assistance mode of the starter generator 16 under a predetermined condition. In what follows, described is an execution procedure of the assistance mode by the starter generator 16.

Figure 9:
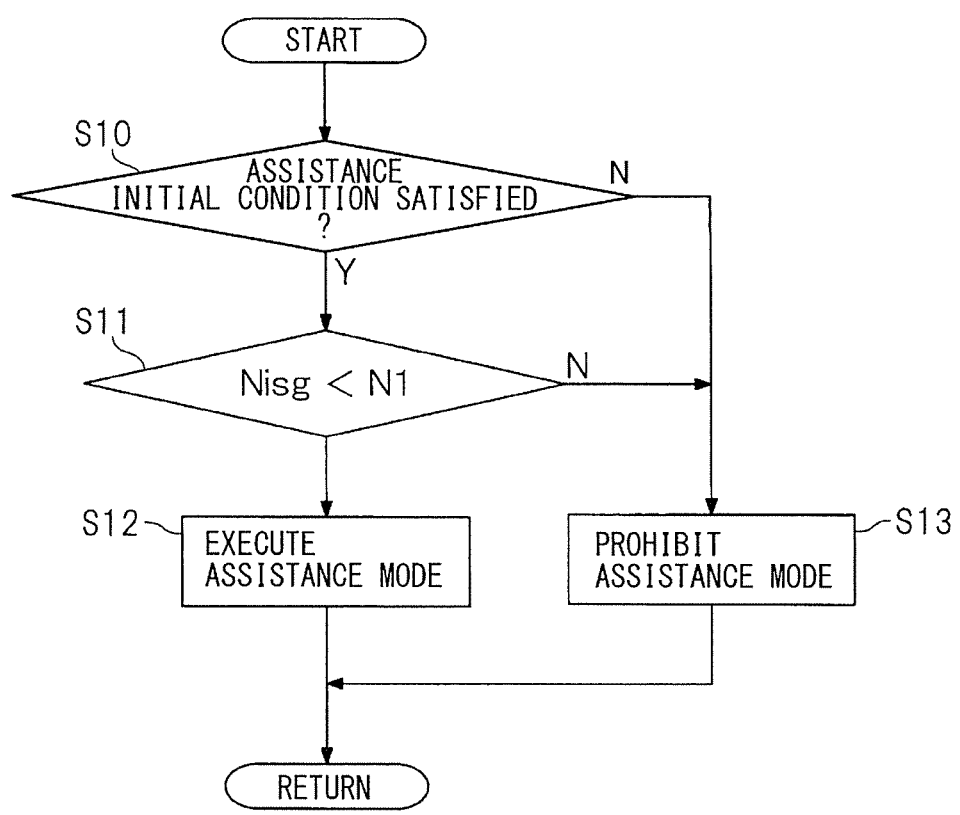
FIG. 9 is a flowchart illustrating an example of an execution procedure of an assistance mode.

FIG. 9 is a flowchart illustrating an example of the execution procedure of the assistance mode. It is to be noted that the flowchart illustrated in FIG. 9 may be executed on predetermined cycles by the motor control unit 62 of the main controller 60. As illustrated in FIG. 9, in step S10, a determination may be made as to whether or not a predetermined assistance initial condition is satisfied. For example, in step S10, in a case with a determination that the state of charge SOC of the lithium-ion battery 32 is higher than a predetermined value, and that the amount of stepping down of the accelerator pedal is larger than a predetermined value, a determination may be made that the assistance initial condition is satisfied. Meanwhile, in step S10, in a case with a determination that the state of charge SOC of the lithium-ion battery 32 is lower than the predetermined value, in a case with a determination that the amount of stepping down of the accelerator pedal is smaller than the predetermined value, or in a case with a determination that the brake pedal is being stepped down, a determination may be made that the assistance initial condition is not satisfied.

In step S10, in the case where the determination is made that the assistance initial condition is satisfied, the flow may proceed to step S11. In step S11, a determination may be made as to whether or not the number of rotations of the rotor, i.e., the rotation speed, Nisg of the starter generator 16 is lower than a predetermined rotation threshold N1. In one implementation, the rotation threshold N1 may serve as a "threshold". In step S11, in a case with a determination that the number of rotations of the rotor Nisg is lower than the rotation threshold N1, the flow may proceed to step S12. In step S12, the assistance mode of the starter generator 16 is executed. In other words, in the case where the number of rotations of the rotor Nisg is lower than the rotation threshold N1, the execution of the assistance mode by the starter generator 16 is permitted. Meanwhile, in step S10, in the case where the determination is made that the assistance initial condition is not satisfied, the flow may proceed to step S13. In step S11, in a case with a determination that the number of rotations of the rotor Nisg is equal to or higher than the rotation threshold N1, the flow may also proceed to step S13. In step S13, the execution of the assistance mode by the starter generator 16 is prohibited.

As described, in the case where the number of rotations of the rotor Nisg is higher than the rotation threshold N1, the assistance mode of the starter generator 16 is prohibited. In other words, in a situation that the number of rotations of the rotor of the starter generator 16 is high, causing the sound pressure level of the noise to become higher in a high-frequency range, the assistance mode is prohibited to prohibit the powering of the starter generator 16. This makes it possible to considerably reduce a current flowing through the power supply cable 90, leading to reduction in the noise from the power supply cable 90 over a wide frequency range.

Figure 10:
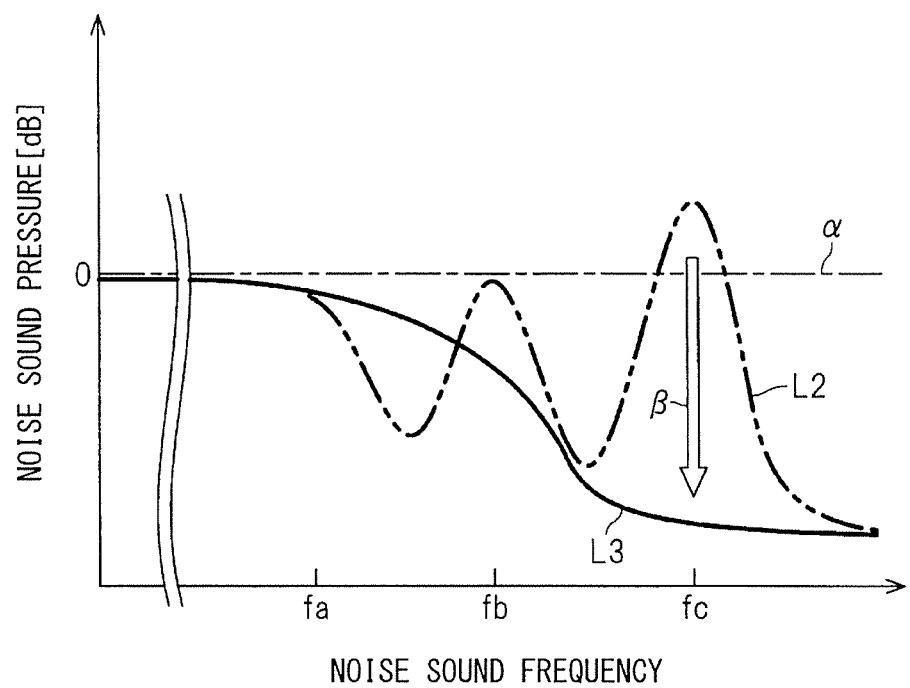
FIG. 10 schematically illustrates the sound pressure level of the noise to be generated from the power supply cable.

FIG. 10 schematically illustrates the sound pressure level of the noise to be generated from the power supply cable 90. A characteristic line L3 denoted by a solid line in FIG. 10 indicates a sound pressure level in a case where the bypass condenser 41 is coupled in parallel to the starter generator 16, and the execution of the assistance mode is prohibited on the basis of the number of rotations of the rotor. It is to be noted that the minimum audible value α and the characteristic line L2 illustrated in FIG. 10 are the same as the minimum audible value α and the characteristic line L2 illustrated in FIG. 8.

As indicated by the characteristic line L3 in FIG. 10, prohibiting the assistance mode of the starter generator 16 on the basis of the number of rotations of the rotor makes it possible to lower the sound pressure level of the noise to a lower value than the minimum audible value α at each of the frequencies fa, fb, and fc. In particular, prohibiting the assistance mode in a high-rotation-speed range of the starter generator 16 makes it possible to considerably lower the sound pressure level of the noise at the frequency fc, as indicated by an arrow β. Thus, prohibiting the execution of the assistance mode on the basis of the number of rotations of the rotor Nisg makes it possible to limit the sound pressure level of the noise to be transmitted from the power supply cable 90 to inside the cabin, to a lower value than the minimum audible value α. In one implementation, the noise may serve as a "sound". In other words, in determining whether or not to prohibit the assistance mode, the rotation threshold N1 to be compared for the determination with the number of rotations of the rotor Nisg is a threshold that is so set, on the basis of, for example, experiments and/or simulation, that the sound pressure level at each frequency does not become higher than the minimum audible value α.

As described, according to one implementation of the technology, the execution of the assistance mode is prohibited, in the case where the number of rotations of the rotor, i.e., the rotation speed, Nisg of the starter generator 16 is higher than the rotation threshold N1. Hence, it is possible to suppress the noise from the power supply cable 90.

Although some implementations of the technology have been described in the forgoing with reference to the accompanying drawings, the technology is by no means limited to the implementations described above. Various changes and modifications may be made to any implementation without departing from the scope of the technology. In the forgoing description, the assistance mode is prohibited on the basis of the number of rotations of the rotor of the starter generator 16. However, this is non-limiting. The assistance mode may be prohibited on the basis of the number of rotations of the engine that increases and decreases proportional to the number of rotations of the rotor. Moreover, the rotation threshold N1 involved in the determination of the prohibition of the assistance mode may be either a preset fixed value or a variable value set in accordance with the powering torque of the starter generator 16. For example, in a case with an increase in the powering torque of the starter generator 16, the sound pressure level of the noise to be generated from the power supply cable 90 also becomes higher. Accordingly, the rotation threshold N1 may be lowered to enlarge a range of the prohibition of the assistance mode.

In the forgoing description, the starter generator 16 is used as the "electric motor". However, this is non-limiting. For example, an electric motor that serves solely as an electric motor may be employed. Moreover, in the forgoing description, the bypass condenser 41 is coupled in parallel to the starter generator 16. However, this is non-limiting. For example, in a case where the prohibition of the assistance mode makes it possible to sufficiently lower the sound pressure level of the noise, the bypass condenser 41 may be removed from the power supply circuit 30.

Figure 11:
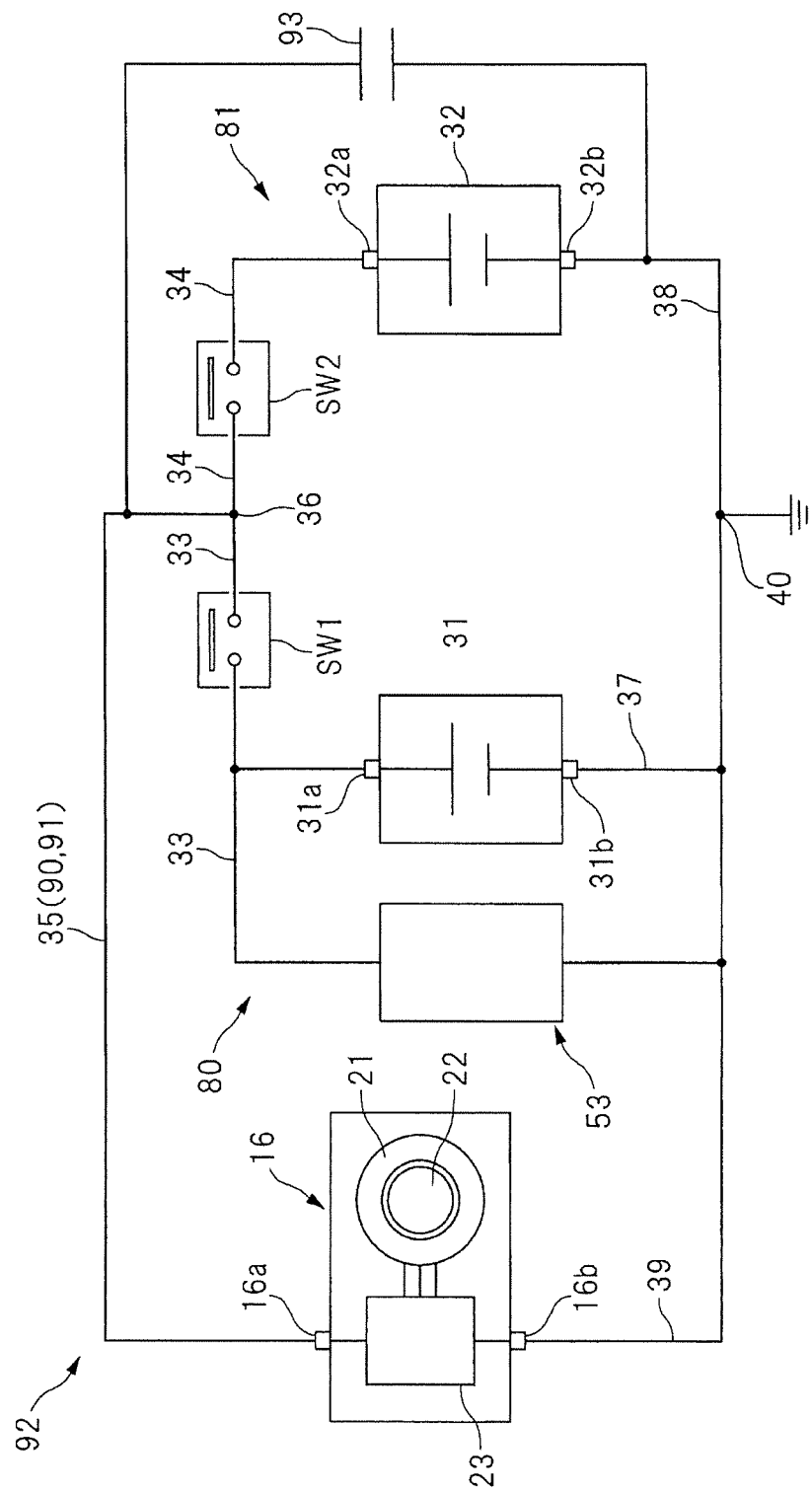
FIG. 11 is a circuit diagram illustrating another example of the power supply circuit.

In the example illustrated in FIG. 2, the bypass condenser 41 is provided near the starter generator 16. However, this is non-limiting. FIG. 11 is a circuit diagram illustrating a power supply circuit 92 as another example. It is to be noted that in FIG. 11, similar components and members to those illustrated in FIG. 2 are denoted by the same reference characters, and description thereof is omitted. Referring to FIG. 11, to the positive electrode line 34 and the negative electrode line 38 of the lithium-ion battery 32, a bypass condenser 93 may be coupled. In one implementation, the bypass condenser 93 may serve as the "condenser". In this case, although the bypass condenser 93 is coupled near the lithium-ion battery 32, the bypass condenser 93 is still coupled in parallel to the starter generator 16. Hence, it is possible to lower the sound pressure level of the noise, owing to the bypass condenser 93. It is to be appreciated that in another alternative, the power supply circuit 30 may include the two bypass condensers 41 and 93, or alternatively, the power supply circuit 92 may include the two bypass condensers 41 and 93.

The main controller 60 illustrated in FIGS. 1 and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the main controller 60 illustrated in FIGS. 1 and 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A power unit for a vehicle, the power unit comprising:
   a transmission;
   a starter generator configured to generate motor power, the starter generator comprising a first electrode terminal and a second electrode terminal, the first electrode terminal being electrically coupled to ground;
   an engine arranged between the transmission and the starter generator, the engine including a crank shaft coupled to the transmission and the starter generator;
   a power supply circuit comprising an electricity storage device electrically coupled to the second electrode terminal of the starter generator;
   a bypass condenser coupled in parallel to the starter generator such that the bypass condenser is to be coupled to the power supply circuit and the ground;
   a power supply cable electrically coupling the electricity storage device to the starter generator, at least part of the power supply cable being provided inside a cabin of the vehicle;
   an inverter being configured to be supplied a current discharged from the electricity storage device through the power supply cable, the inverter being configured to supply the current to a stator of the starter generator; and
   a controller configured to cause execution of an assistance mode, the assistance mode including transmitting the motor power from the starter generator to the engine in operation when the starter generator is controlled to a powering state using the electricity storage device, wherein
   the controller is configured to permit the execution of the assistance mode based on determining that a number of rotations of the starter generator or a number of rotations of the engine is lower than a rotation threshold,
   the controller is configured to prohibit the execution of the assistance mode based on determining that the number of rotations of the starter generator or the number of rotations of the engine is higher than the rotation threshold, and
   the rotation threshold is a variable value set in accordance with a powering torque of the starter generator so that the rotation threshold is lowered in accordance with an increase in the powering torque of the starter generator.

2. The power unit according to claim 1, wherein the controller prohibits the execution of the assistance mode on a basis of the rotation threshold, to limit a sound pressure level of a sound having a frequency to be transmitted from the power supply cable to inside the cabin of the vehicle, to a lower value than zero dB, and
   wherein the frequency of the sound corresponds to a peak of the sound pressure level which is greater than zero dB in a state where the assistance mode is executed, and a switching operation of the starter generator is executed.

3. The power unit according to claim 2, wherein the electricity storage device is provided inside the cabin of the vehicle.

4. The power unit according to claim 1, wherein the electricity storage device is provided inside the cabin of the vehicle.

5. The power unit according to claim 1, wherein, when the starter generator is controlled to the powering state, the current discharged from the electricity storage device is supplied to the inverter through the power supply cable.

6. The power unit according to claim 1, wherein the starter generator is coupled to the crank shaft via a belt mechanism that is configured to transmit the motor power to the engine.

7. The power unit according to claim 1, wherein the controller is configured to permit the execution of the assistance mode on a condition that i) a state of charge of the electricity storage device is higher than a first predetermined value, ii) an amount of stepping down of an accelerator pedal of the vehicle is larger than a second predetermined value, and iii) the rotation speed of the starter generator is lower than the rotation threshold.

8. The power unit according to claim 1, wherein
the starter generator is configured to serve as an electric generator to be driven by the crank shaft,
the starter generator is disposed in an engine room of the vehicle,
the power supply circuit is disposed in a center console,
the power supply cable comprises i) an end connected to the starter generator and ii) another end connected to the power supply circuit,
the controller prohibits the execution of the assistance mode on a basis of the rotation threshold to limit a sound pressure level of a sound having a frequency to a lower value than zero dB,
the power supply cable is configured to generate the sound when the assistance mode is executed in a state where at least one of the number of rotations of the starter generator or the number of rotations of the engine is higher than the rotation threshold, and
the frequency corresponds to a peak of the sound pressure level which is greater than zero dB.

9. A power unit for a vehicle, the power unit comprising:
a transmission;
a starter generator configured generate motor power, the starter generator comprising a first electrode terminal and a second electrode terminal, the first electrode terminal being electrically coupled to ground;
an engine arranged between the transmission and the starter generator, the engine including a crank shaft coupled to the transmission and the starter generator;
a power supply circuit comprising an electricity storage device electrically coupled to the second electrode terminal of the starter generator;
a bypass condenser coupled in parallel to the starter generator such that the bypass condenser is to be coupled to the power supply circuit and the ground;
a power supply cable electrically coupling the electricity storage device to the starter generator, at least part of the power supply cable being provided inside a cabin of the vehicle;
an inverter being configured to be supplied a current discharged from the electricity storage device through the power supply cable, the inverter being configured to supply the current to a stator of the starter generator; and
circuitry configured to cause execution of an assistance mode, the assistance mode including transmitting the motor power from the starter generator to the engine in operation when the starter generator is controlled to a powering state using the electricity storage device, wherein
the circuitry is configured to permit the execution of the assistance mode based on determining that a number of rotations of the starter generator or a number of rotations of the engine is lower than a rotation threshold,
the circuitry is configured to prohibit the execution of the assistance mode based on determining that the number of rotations of the starter generator or the number of rotations of the engine is higher than the rotation threshold, and
the rotation threshold is a variable value set in accordance with a powering torque of the starter generator so that the rotation threshold is lowered in accordance with an increase in the powering torque of the starter generator.

10. The power unit according to claim 9, wherein, when the starter generator is controlled to the powering state, the current discharged from the electricity storage device is supplied to the inverter through the power supply cable.

11. The power unit according to claim 9, wherein the starter generator is coupled to the crank shaft via a belt mechanism that is configured to transmit the motor power to the engine.

12. The power unit according to claim 9, wherein the circuitry is configured to permit the execution of the assistance mode on a condition that i) a state of charge of the electricity storage device is higher than a first predetermined value, ii) an amount of stepping down of an accelerator pedal of the vehicle is larger than a second predetermined value, and iii) the rotation speed of the starter generator is lower than the rotation threshold.

13. The power unit according to claim 9,
wherein the circuitry prohibits the execution of the assistance mode on a basis of the rotation threshold, to limit a sound pressure level of a sound having a frequency to be transmitted from the power supply cable to inside the cabin of the vehicle, to a lower value than zero dB, and
wherein the frequency is corresponding to a peak of the sound pressure level which is greater than zero dB in a state where the assistance mode is executed, and a switching operation of the starter generator is executed.

14. The power unit according to claim 9, wherein
the starter generator is configured to serve as an electric generator to be driven by the crank shaft,
the starter generator is disposed in an engine room of the vehicle,
the power supply circuit is disposed in a center console,
the power supply cable comprises i) an end connected to the starter generator and ii) another end connected to the power supply circuit,
the circuitry prohibits the execution of the assistance mode on a basis of the rotation threshold to limit a sound pressure level of a sound having a frequency to a lower value than zero dB,
the power supply cable is configured to generate the sound when the assistance mode is executed in a state where at least one of the number of rotations of the starter generator or the number of rotations of the engine is higher than the rotation threshold, and
the frequency corresponds to a peak of the sound pressure level which is greater than zero dB.

15. A vehicle control apparatus to be mounted on a vehicle, the vehicle control apparatus comprising a controller, and a sensor coupled to the controller,
wherein the vehicle includes:
a transmission;
a starter generator configured to generate motor power, the starter generator comprising a first electrode terminal and a second electrode terminal, the first electrode terminal being electrically coupled to ground;
an engine arranged between the transmission and the starter generator, the engine including a crank shaft coupled to the transmission and the starter generator;
a power supply circuit comprising an electricity storage device electrically coupled to the second electrode terminal of the starter generator;
a bypass condenser coupled in parallel to the starter generator such that the bypass condenser is to be coupled to the power supply circuit and the ground;
an electricity storage device electrically coupled to the starter generator;

a power supply cable electrically coupling the electricity storage device to the starter generator, at least part of the power supply cable being provided inside a cabin of the vehicle; and an inverter being configured to be supplied a current discharged from the electricity storage device through the power supply cable, the inverter being configured to supply the current to a stator of the starter generator, wherein the controller is configured to cause execution of an assistance mode, the assistance mode including transmitting the motor power from the starter generator to the engine in operation when the starter generator is controlled to a powering state using the electricity storage device, wherein the controller is configured to permit the execution of the assistance mode based on determining that a number of rotations of the starter generator or a number of rotations of the engine is lower than a rotation threshold, wherein the controller is configured to prohibit the execution of the assistance mode based on determining that the number of rotations of the starter generator or the number of rotations of the engine is higher than the rotation threshold, and the rotation threshold is a variable value set in accordance with a powering torque of the starter generator so that the rotation threshold is lowered in accordance with an increase in the powering torque of the starter generator.

16. The vehicle control apparatus according to claim 15, wherein, when the starter generator is controlled to the powering state, the current discharged from the electricity storage device is supplied to the inverter through the power supply cable.

17. The vehicle control apparatus according to claim 15, wherein the starter generator is coupled to the crank shaft via a belt mechanism that is configured to transmit the motor power to the engine.

18. The vehicle control apparatus according to claim 15, wherein the controller is configured to permit the execution of the assistance mode on a condition that i) a state of charge of the electricity storage device is higher than a first predetermined value, ii) an amount of stepping down of an accelerator pedal of the vehicle is larger than a second predetermined value, and iii) the rotation speed of the starter generator is lower than the rotation threshold.

19. The vehicle control apparatus according to claim 15, wherein the controller prohibits the execution of the assistance mode on a basis of the rotation threshold, to limit a sound pressure level of a sound having a frequency to be transmitted from the power supply cable to inside the cabin of the vehicle, to a lower value than zero dB, and wherein the frequency is corresponding to a peak of the sound pressure level which is greater than zero dB in a state where the assistance mode is executed, and a switching operation of the starter generator is executed.

20. The vehicle control apparatus according to claim 15, wherein the starter generator is configured to serve as an electric generator to be driven by the crank shaft, the starter generator is disposed in an engine room of the vehicle, the power supply circuit is disposed in a center console, the power supply cable comprises i) an end connected to the starter generator and ii) another end connected to the power supply circuit, the controller prohibits the execution of the assistance mode on a basis of the rotation threshold to limit a sound pressure level of a sound having a frequency to a lower value than zero dB, the power supply cable is configured to generate the sound when the assistance mode is executed in a state where at least one of the number of rotations of the starter generator or the number of rotations of the engine is higher than the rotation threshold, and the frequency corresponds to a peak of the sound pressure level which is greater than zero dB.

* * * * *